(12) United States Patent
Suzuki et al.

(10) Patent No.: US 11,176,961 B2
(45) Date of Patent: Nov. 16, 2021

(54) SUSPENSION ASSEMBLY AND DISK DEVICE

(71) Applicants: Kabushiki Kaisha Toshiba, Tokyo (JP); Toshiba Electronic Devices & Storage Corporation, Tokyo (JP)

(72) Inventors: Yasuo Suzuki, Fujisawa Kanagawa (JP); Takuma Kido, Mitaka Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/939,352

(22) Filed: Jul. 27, 2020

(65) Prior Publication Data

US 2021/0280209 A1   Sep. 9, 2021

(30) Foreign Application Priority Data

Mar. 4, 2020   (JP) .............................. JP2020-037013

(51) Int. Cl.
G11B 5/48   (2006.01)

(52) U.S. Cl.
CPC .......... *G11B 5/4826* (2013.01); *G11B 5/4833* (2013.01); *G11B 5/4846* (2013.01); *G11B 5/4853* (2013.01); *G11B 5/4873* (2013.01)

(58) Field of Classification Search
CPC ... G11B 5/4826; G11B 5/4853; G11B 5/4873; G11B 5/4846; G11B 5/4833
See application file for complete search history.

(56) References Cited

U.S. PATENT DOCUMENTS

| | | | | | |
|---|---|---|---|---|---|
| 5,771,136 | A | * | 6/1998 | Girard | G11B 5/4833 360/245.7 |
| 5,930,079 | A | * | 7/1999 | Vera | G11B 5/4833 360/245.7 |
| 6,067,209 | A | * | 5/2000 | Aoyagi | G11B 5/54 360/254.7 |
| 6,069,773 | A | * | 5/2000 | Frater | G11B 5/4813 360/245.7 |

(Continued)

FOREIGN PATENT DOCUMENTS

| | | |
|---|---|---|
| JP | 2014-22013 A | 2/2014 |
| JP | 2015-41394 A | 3/2015 |
| JP | 5931622 B2 | 6/2016 |

*Primary Examiner* — Brian E Miller
(74) *Attorney, Agent, or Firm* — Allen & Overy, LLP

(57) ABSTRACT

According to one embodiment, a suspension assembly includes a support plate including a distal end and a proximal end portion, a wiring member including a gimbal portion and provided on the support plate, and a magnetic head mounted on the gimbal portion. The gimbal portion includes a first end portion located on a side of the proximal end portion with respect to the magnetic head and welded to the support plate, a second end located on a side of the distal end portion with respect to the magnetic head and welded to the support plate, a tongue portion on which the magnetic head is mounted, located between the first end portion and the second end portion, and supported so as to be displaceable relative to the support plate, and a limiter opposing the tongue portion with a gap.

16 Claims, 12 Drawing Sheets

Before limiter bending     After limiter bending

(56) References Cited

U.S. PATENT DOCUMENTS

| | | | | |
|---|---|---|---|---|
| 6,137,657 A * | 10/2000 | Coon | G11B 5/4826 360/245.7 |
| 6,172,853 B1 * | 1/2001 | Davis | G11B 5/4826 360/245.7 |
| 6,191,915 B1 * | 2/2001 | Takagi | G11B 5/4826 360/245.7 |
| 6,233,121 B1 * | 5/2001 | Pan | G11B 5/4826 360/245.7 |
| 6,243,235 B1 * | 6/2001 | Fu | G11B 5/4826 360/234.5 |
| 6,388,843 B1 * | 5/2002 | Takagi | G11B 5/4833 360/245.7 |
| 6,424,498 B1 * | 7/2002 | Patterson | G11B 5/4826 360/245.7 |
| 6,445,546 B1 * | 9/2002 | Coon | G11B 5/4826 360/245.7 |
| 6,587,309 B2 * | 7/2003 | Nojima | G11B 5/4826 360/245.7 |
| 6,801,400 B2 * | 10/2004 | Fu | G11B 5/4826 360/245.7 |
| 6,885,523 B1 * | 4/2005 | Summers | G11B 5/4846 360/244.3 |
| 6,995,953 B2 * | 2/2006 | Mahoney | G11B 5/4826 360/245.7 |
| 7,006,333 B1 * | 2/2006 | Summers | G11B 5/4826 360/245.7 |
| 7,130,157 B2 * | 10/2006 | Sassine | G11B 5/4826 360/245.7 |
| 7,317,595 B2 | 1/2008 | Tsuchida et al. | |
| 7,489,477 B1 * | 2/2009 | Padeski | G11B 5/4826 360/245.7 |
| 7,583,474 B2 * | 9/2009 | Suzuki | G11B 5/4826 360/245.7 |
| 7,602,585 B2 * | 10/2009 | Choi | G11B 5/5521 360/245.7 |
| 7,606,001 B2 * | 10/2009 | Ono | G11B 5/4833 360/245 |
| 7,609,481 B1 * | 10/2009 | Padeski | G11B 5/4826 360/245.6 |
| 7,719,797 B1 * | 5/2010 | Mei | G11B 5/6005 360/245.7 |
| 7,751,149 B1 * | 7/2010 | Mei | G11B 5/4853 360/245.7 |
| 7,764,467 B2 * | 7/2010 | Hanya | G11B 5/4833 360/245.7 |
| 8,116,039 B2 * | 2/2012 | Takikawa | G11B 5/4833 360/245.7 |
| 8,837,090 B2 * | 9/2014 | Greminger | G11B 5/4826 360/245.7 |
| 8,881,374 B1 * | 11/2014 | Bjorstrom | G11B 5/4833 29/603.03 |
| 9,093,089 B1 * | 7/2015 | Aoki | G11B 5/4826 |
| 9,214,176 B1 * | 12/2015 | Sharma | G11B 5/483 |
| 2002/0051324 A1 * | 5/2002 | Nojima | G11B 5/4826 360/245.7 |
| 2002/0075602 A1 * | 6/2002 | Mangold | G11B 5/6005 360/245.7 |
| 2003/0137774 A1 * | 7/2003 | Fu | G11B 5/4826 360/245.7 |
| 2004/0070883 A1 * | 4/2004 | Mahoney | G11B 5/4826 360/245.7 |
| 2005/0036239 A1 * | 2/2005 | Weber | G11B 5/4833 360/245.5 |
| 2005/0157428 A1 * | 7/2005 | Choi | G11B 5/5521 360/245.7 |
| 2006/0098347 A1 * | 5/2006 | Yao | G11B 5/4826 360/294.4 |
| 2014/0022671 A1 | 1/2014 | Takikawa et al. | |
| 2014/0022674 A1 * | 1/2014 | Takikawa | G11B 5/4813 360/244.5 |
| 2014/0022675 A1 * | 1/2014 | Hanya | G11B 5/4813 360/244.5 |
| 2014/0168821 A1 * | 6/2014 | Miller | G11B 5/4826 360/245.7 |
| 2015/0055253 A1 | 2/2015 | Takikawa et al. | |
| 2019/0066720 A1 | 2/2019 | Yamada et al. | |

* cited by examiner

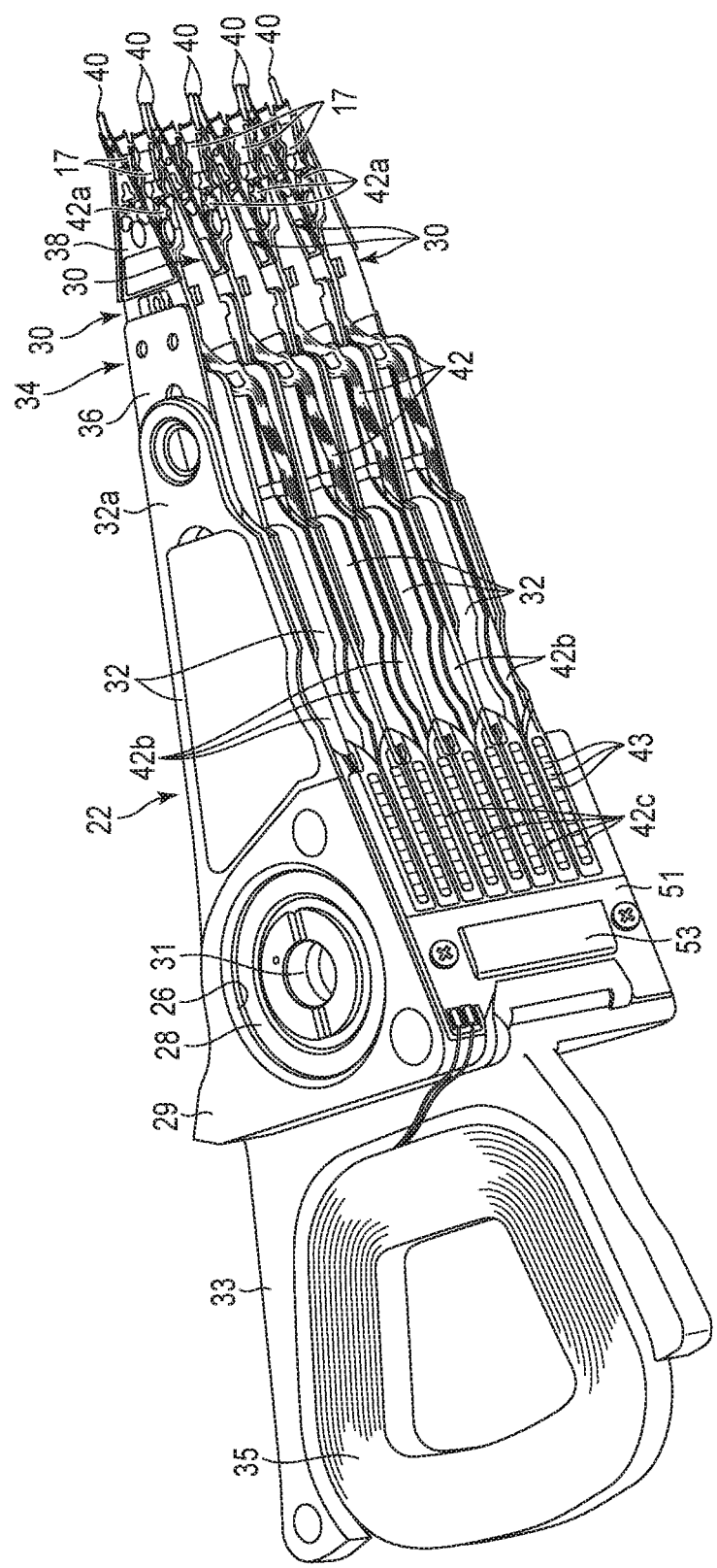
F I G. 2

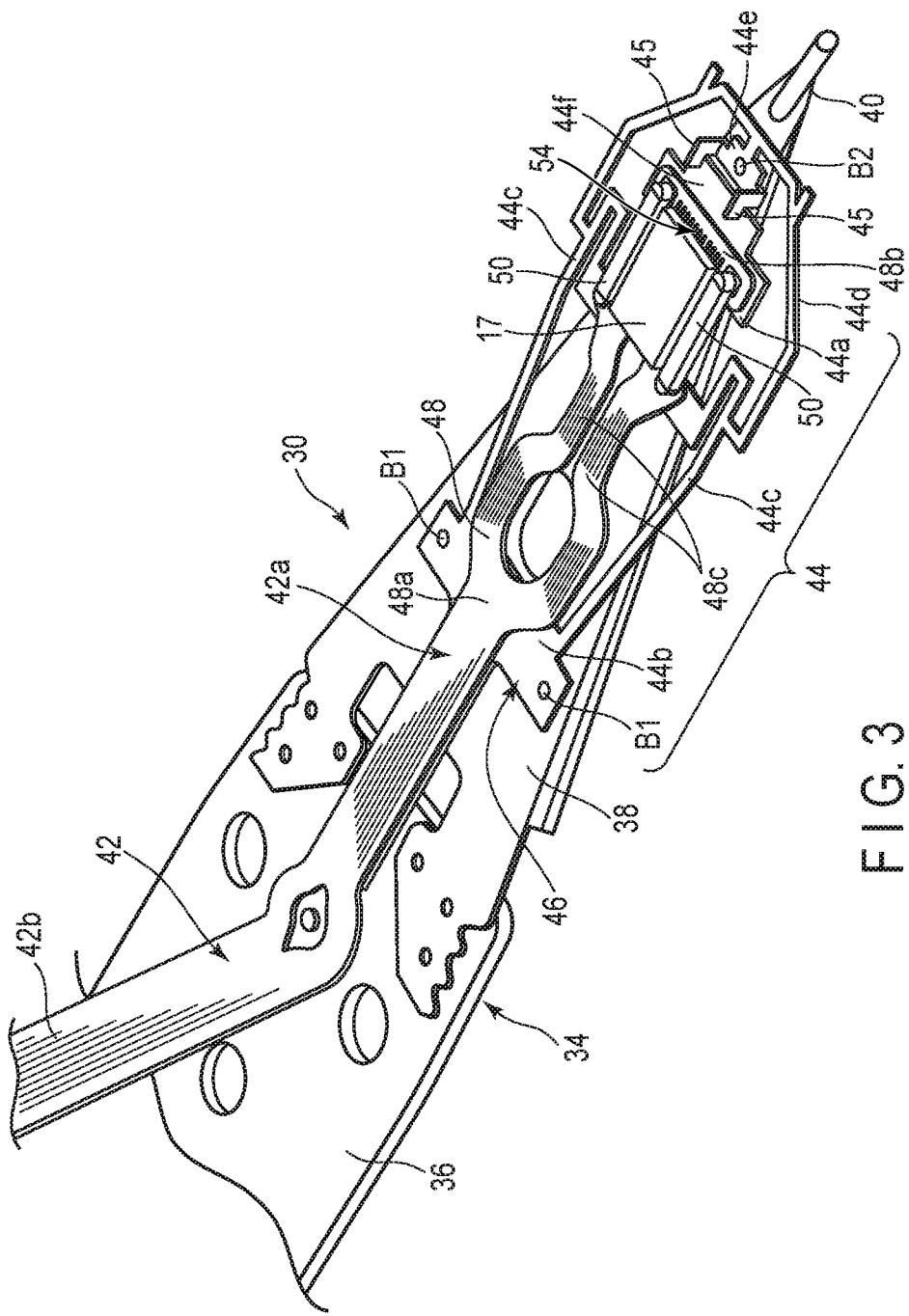
F I G. 3

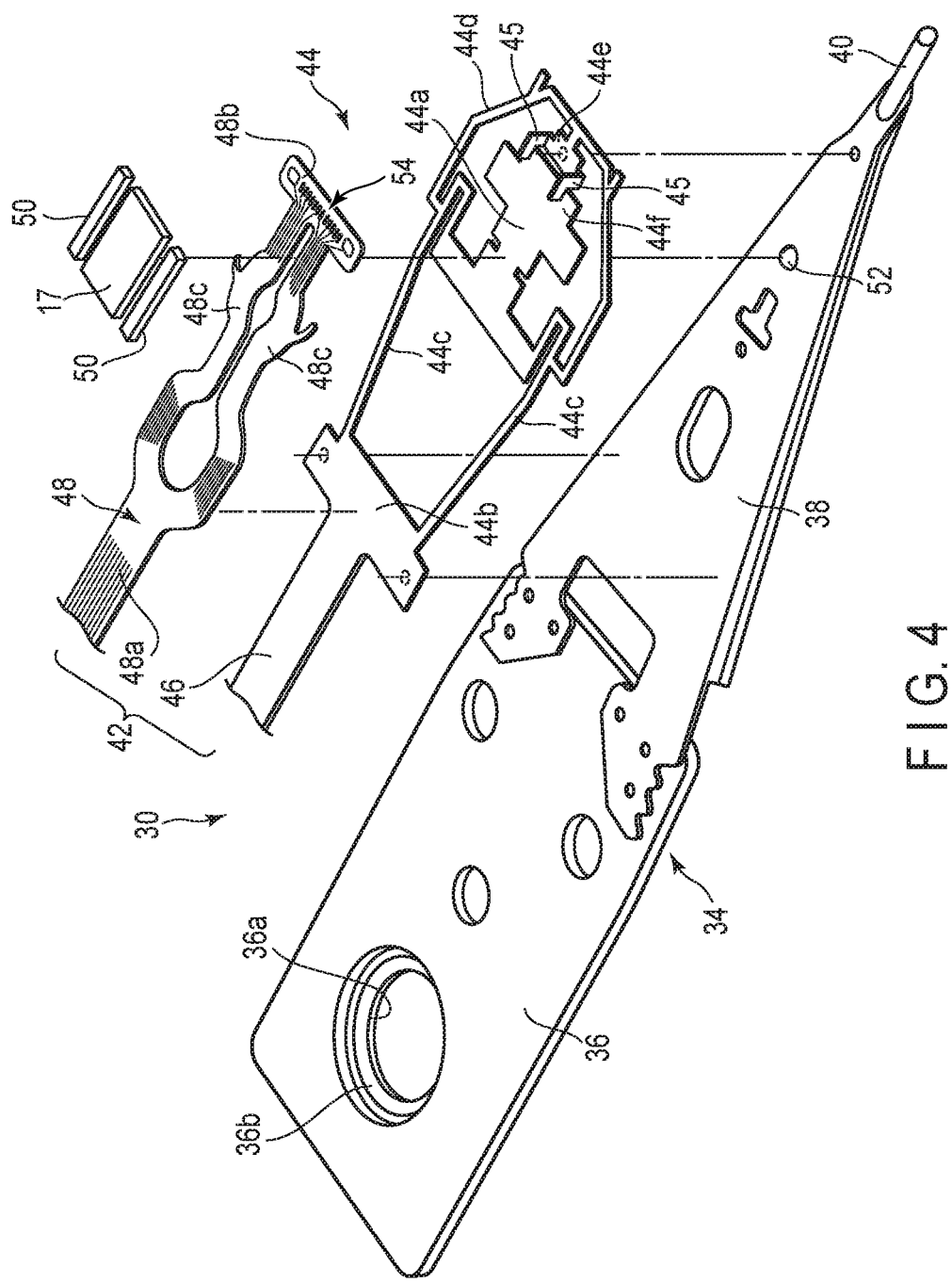
F I G. 4

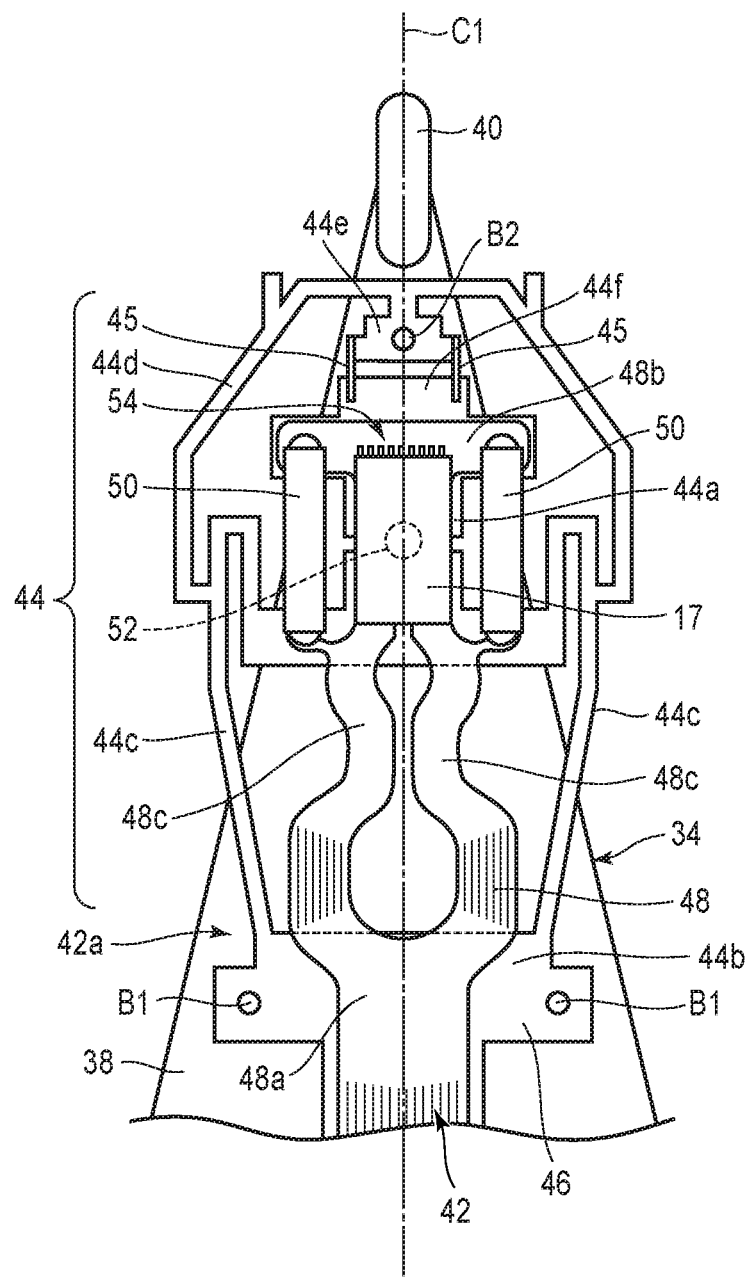
F I G. 5

(During normal operation)

(During impact)

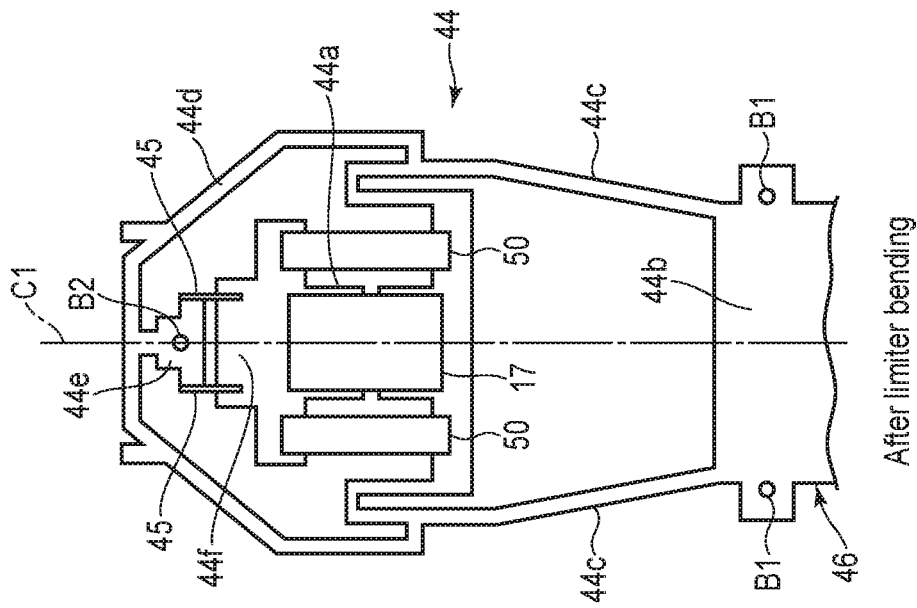
FIG. 8A  Before limiter bending
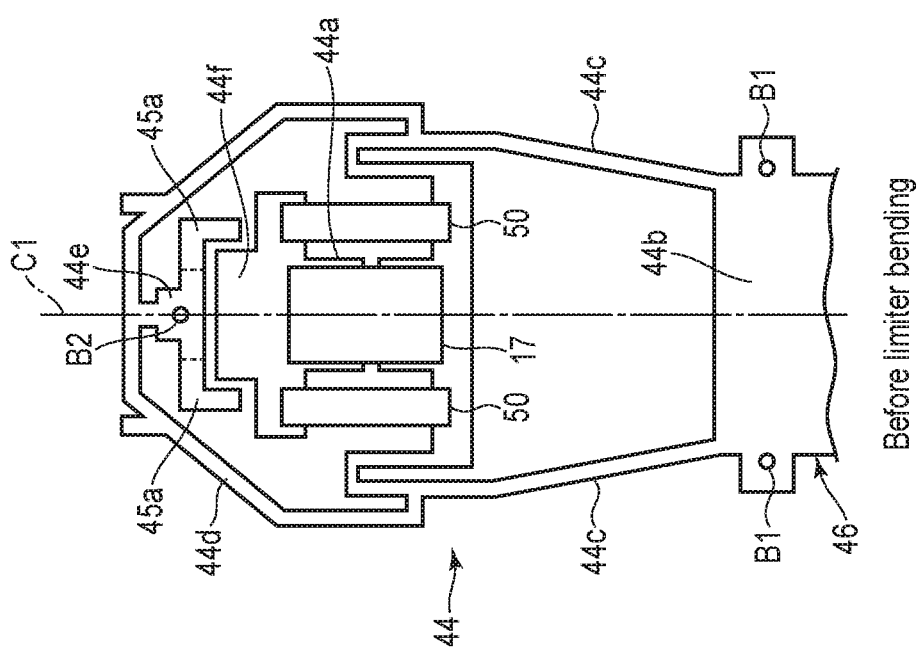
FIG. 8B  After limiter bending

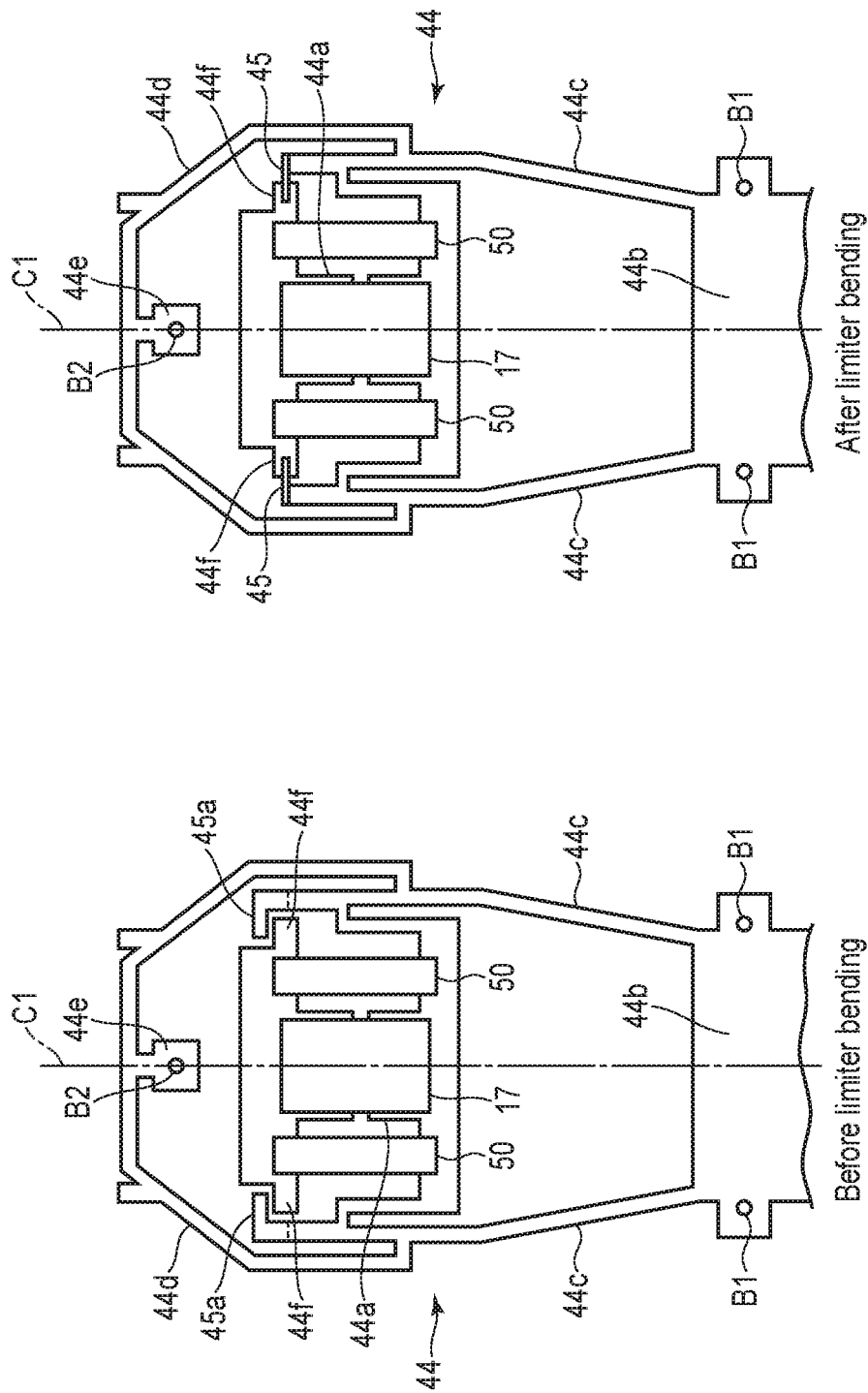
FIG. 10A  Before limiter bending
FIG. 10B  After limiter bending

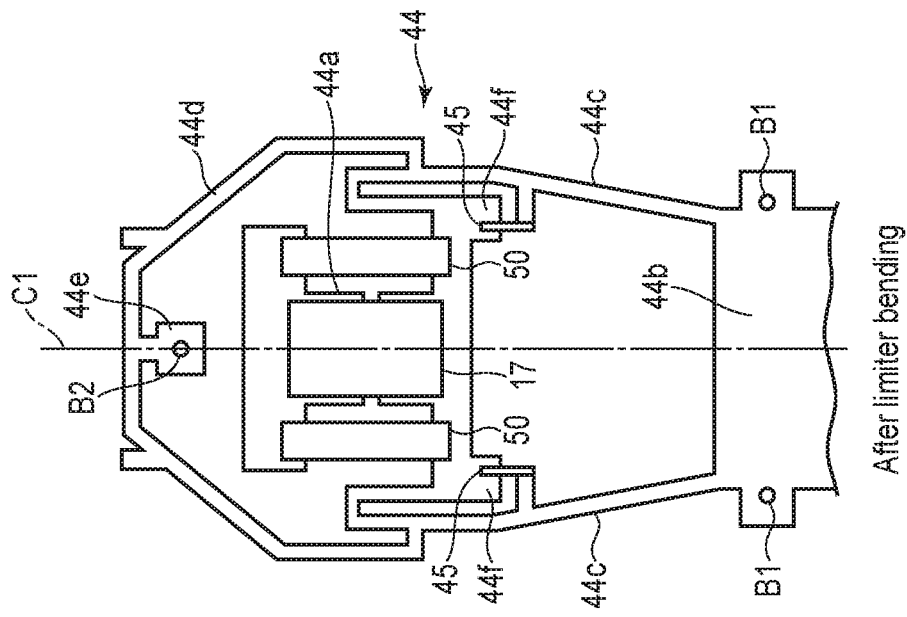
F I G. 11B
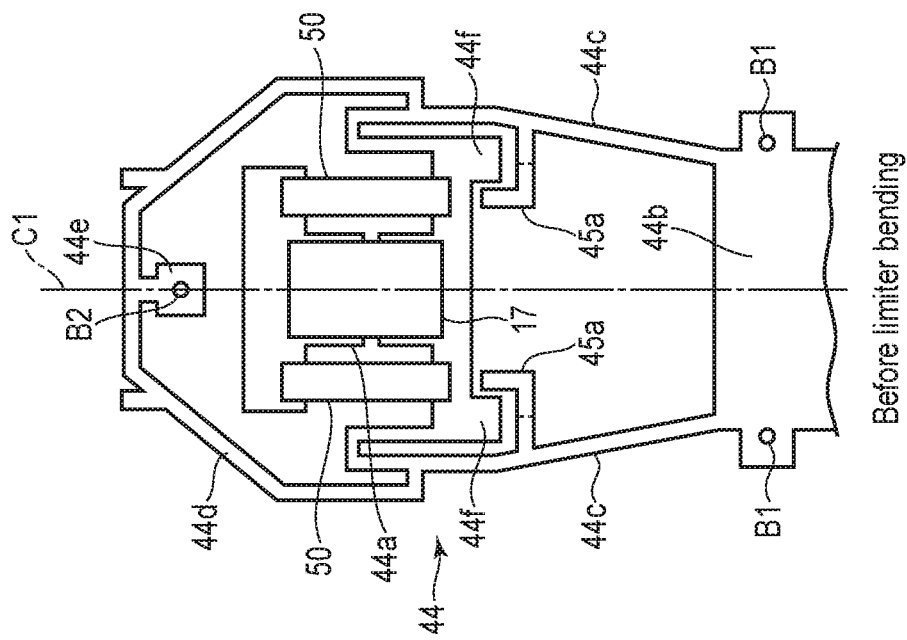
F I G. 11A

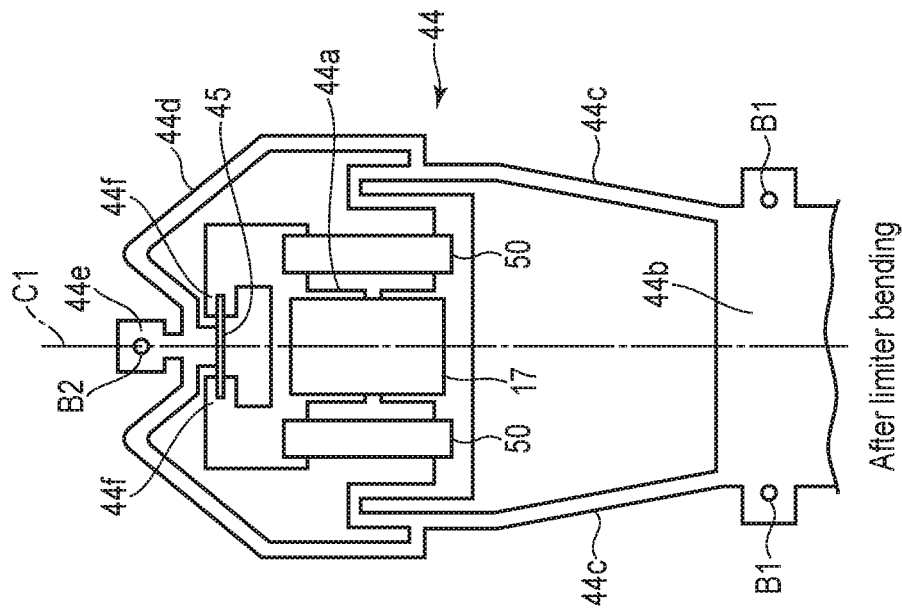
FIG. 12B  After limiter bending
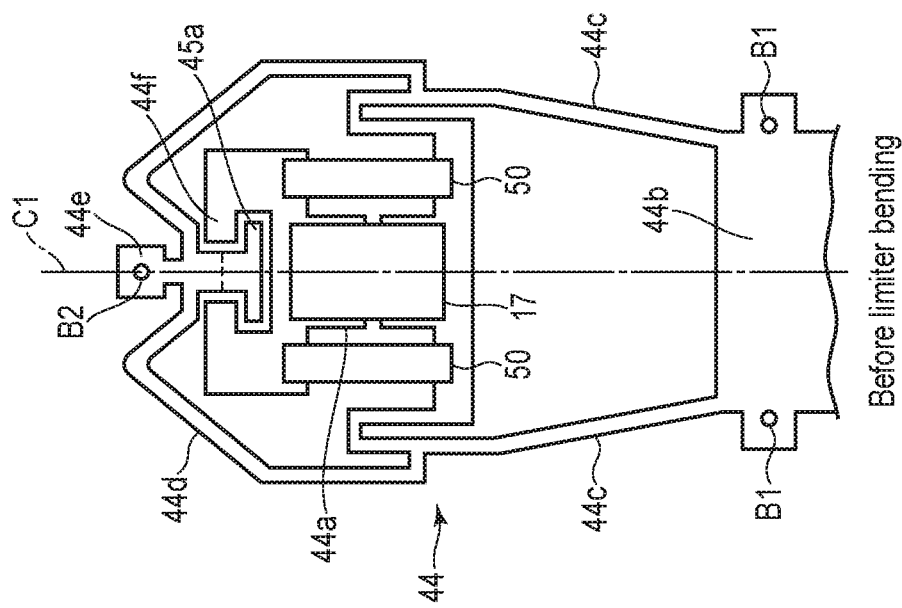
FIG. 12A  Before limiter bending

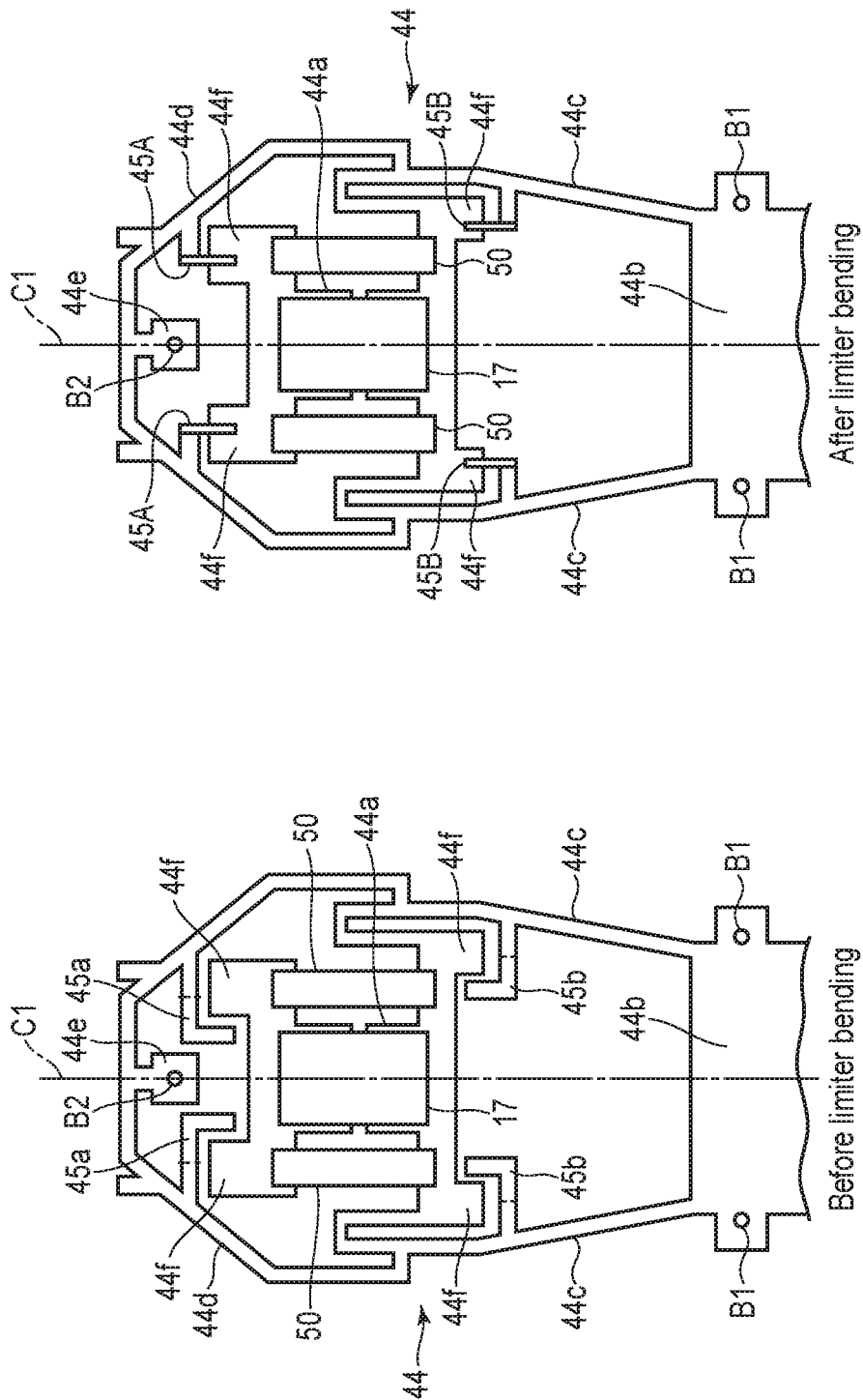
FIG. 13A  Before limiter bending
FIG. 13B  After limiter bending

SUSPENSION ASSEMBLY AND DISK DEVICE

CROSS-REFERENCE TO RELATED APPLICATIONS

This application is based upon and claims the benefit of priority from. Japanese Patent Application No. 2020-037013, filed Mar. 4, 2020, the entire contents of which are incorporated herein by reference.

FIELD

Embodiments described herein relate generally to a suspension assembly used in a disk device and to a disk device including the same.

BACKGROUND

As a disk device, for example, a hard disk drive (HDD) includes a plurality of magnetic disks provided rotatably in a housing; a plurality of magnetic heads that read and write information from/to the magnetic disks, and a head actuator supporting the magnetic heads to be movable with respect to the magnetic disks.

The head actuator includes an actuator block that is rotatably supported, and a plurality of head suspension assemblies (may be referred to as head gimbal assemblies) which extend from the actuator block and at the distal ends of which magnetic heads are supported. Each of the head suspension assembly comprises a base plate, one end of which is fixed to an arm, a load beam that extends from the base plate, a tab that extends from the distal end of the load beam, and a flexure (wiring member) provided on the load beam and the base plate. The flexure includes a displaceable gimbal portion and a magnetic head is mounted on the gimbal portion.

In a disk device as described above, because the gimbal portion of the flexure is displaceable, when a large external impact acts upon the disk device, the gimbal portion may be excessively deformed and the gimbal portion or the magnetic head may be damaged.

BRIEF DESCRIPTION OF THE DRAWINGS

FIG. 2 is a perspective view illustrating an actuator assembly of the HDD.

FIG. 3 is a perspective view illustrating a head suspension assembly of the actuator assembly.

FIG. 4 is an exploded perspective view illustrating the head suspension assembly.

FIG. 5 is a plan view illustrating the head suspension assembly.

FIG. 8A is a plan view illustrating a state before bending of limiters of the head suspension assembly.

FIG. 8B is a plan view illustrating a state after bending of the limiters of the head suspension assembly.

FIG. 10A is a plan view illustrating a state before bending of limiters of a head suspension assembly according to a second modification example.

FIG. 10B is a plan view illustrating a state after bending of the limiters of the head suspension assembly according to the second modification example.

FIG. 11A is a plan view illustrating a state before bending of limiters of a head suspension assembly according to a third modification example.

FIG. 11B is a plan view illustrating a state after bending of the limiters of the head suspension assembly according to the third modification example.

FIG. 12A is a plan view illustrating a state before bending of limiters of a head suspension assembly according to a fourth modification example.

FIG. 12B is a plan view illustrating a state after bending of the limiters of the head suspension assembly according to the fourth modification example.

FIG. 13A is a plan view illustrating a state before bending of limiters of a head suspension assembly according to a fifth modification example.

FIG. 13B is a plan view illustrating a state after bending of the limiters of the head suspension assembly according to the fifth modification example.

DETAILED DESCRIPTION

Figure 1:
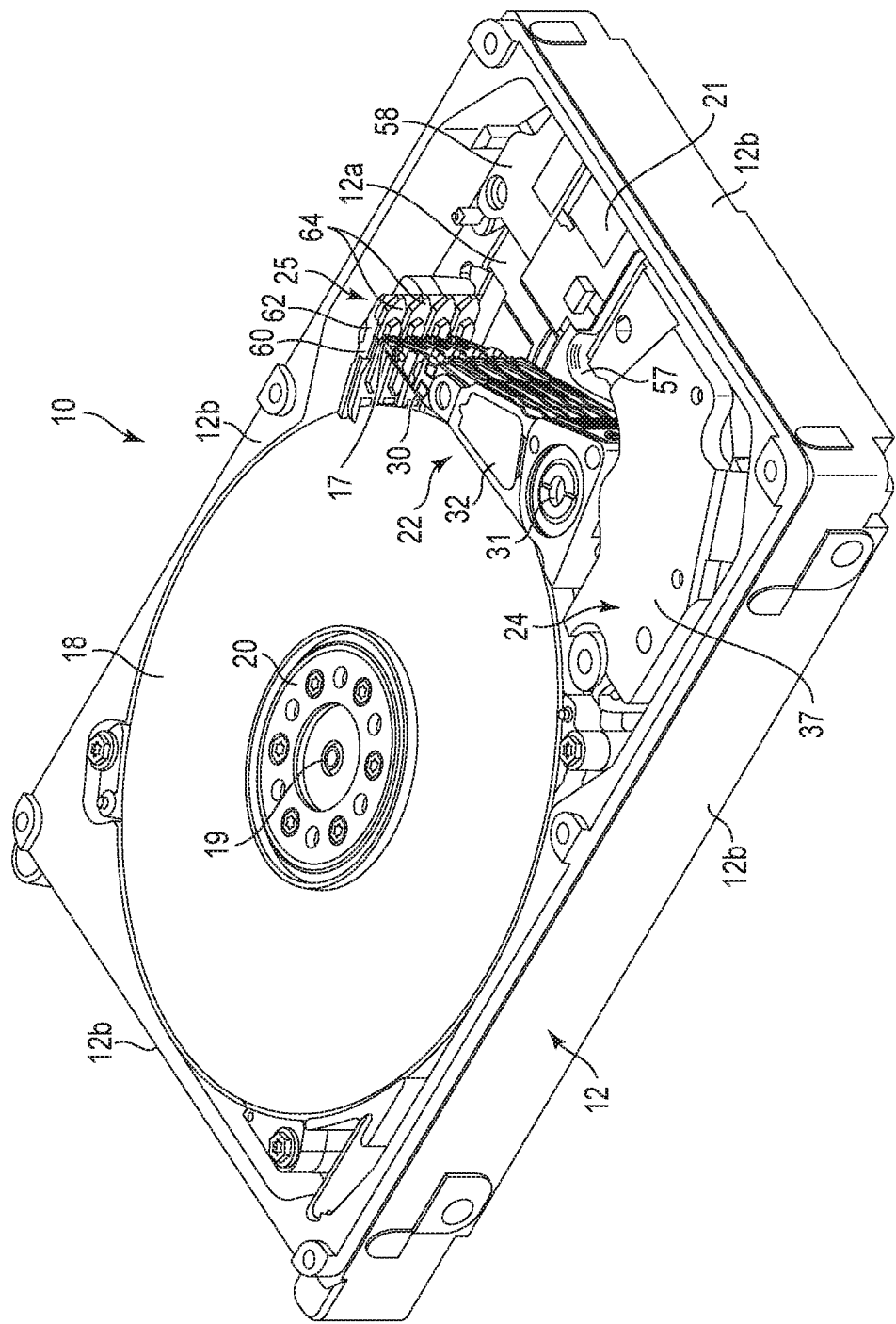
FIG. 1 is a perspective view illustrating a hard disk drive (HDD) according to an embodiment with its top cover omitted.

Various embodiments will be described hereinafter with reference to the accompanying drawings. In general, according to one embodiment, a suspension assembly comprises: a support plate including a distal end and a proximal end portion; a wiring member comprising a gimbal portion and provided on the support plate; and a magnetic head mounted on the gimbal portion. The gimbal portion comprises a first end portion located on a side of the proximal end portion with respect to the magnetic head and welded to the support plate, a second end located on a side of the distal end portion with respect to the magnetic head and welded to the support plate, a tongue portion on which the magnetic head is mounted, located between the first end portion and the second end portion, and supported so as to be displaceable relative to the support plate, and a limiter opposing the tongue portion with a gap.

Note that the disclosure is merely an example and it goes without saying that any appropriate modifications which a person skilled in the art could easily conceive of while preserving the gist of the invention automatically fall within the scope of the present invention. Furthermore, although the width, thickness, shape, and so forth of each part are sometimes represented schematically in the drawings in comparison with the actual embodiment in order to provide a clearer description, such representation is merely illustrative and does not limit interpretation of the present invention. Moreover, in the present specification and each of the drawings, detailed descriptions are sometimes omitted, where appropriate, by assigning the same reference signs to elements like those described earlier in relation to drawings already shown.

Embodiment

As a disk device, a hard disk drive (HDD) according to an embodiment will be described in detail.

FIG. 1 is a perspective view of the HDD according to an embodiment, with a cover removed.

As illustrated, the HDD comprises a rectangular housing 10. The housing 10 comprises a rectangular box-shaped base 12 with an upper surface opened, and a top cover not shown. The base 12 includes a rectangular bottom wall 12a and side walls 12b standing along the peripheral edges of the bottom wall and the base 12 is integrally molded of, for example, aluminum. The top cover is formed of, for example, stainless steel into a shape of a rectangular plate shape and is fixed to the side walls 12b of the base 12 with a plurality of screws.

In the housing 10, a plurality of magnetic disks 18 and a spindle motor 19 are provided, the magnetic disks 18 serving as disk-shaped recording media, the spindle motor 19 supporting and rotating the magnetic disks 18. The spindle motor 19 is arranged on the bottom wall 12a. Each of the magnetic disks 18 includes, for example, a substrate that is formed into a disk shape with a diameter of 95 mm (3.5 inches) and made of a nonmagnetic material, such as glass, and a magnetic recording layer that is formed on an upper surface (first surface) and a lower surface (second surface) of the substrate. The magnetic disks 18 are coaxially fitted to a hub, which is not illustrated, of the spindle motor 19 and further clamped by a clamp spring 20. The magnetic disks 18 are supported to be positioned parallel to the bottom wall 12a of the base 12. The magnetic disks 18 are rotated at a predetermined rotation speed by the spindle motor 19.

In the present embodiment, for example, four magnetic disks 18 are arranged in the housing 10, but the number of the magnetic disks 18 is not limited to this and may be three or less, or five or more.

In the housing 10 are provided a plurality of magnetic heads 17, which write and read information on and from the magnetic disks 18, and an actuator assembly 22, which supports the magnetic heads 17 such as to be movable with respect to the respective magnetic disks 18. In the housing 10 are provided a voice coil motor (VCM) 24 which rotates and positions the actuator assembly 22, a ramped loading mechanism. 25 which holds the magnetic heads 17 at respective unloading positions spaced away from the respective magnetic disks 18 when the magnetic heads 32 are moved to the outermost circumferences of the respective magnetic disks 18, and a board unit (FTC unit) 21 on which electronic components such as conversion connectors are mounted.

A printed circuit board (not shown) is fixed by screws to an outer surface of the bottom wall 12a of the base 12. The printed circuit board constitutes a control unit, which controls the operation of the spindle motor 19 and also controls the respective operations of the VCM 24 and the magnetic heads 17 via the board unit 21.

FIG. 2 is a perspective view of the actuator assembly 22. As illustrated, the actuator assembly 22 comprises an actuator block 29 with a through hole 26, a bearing unit (unit bearing) 28 provided in the through hole 26, a plurality of, for example, five arms 32 extending from the actuator block 29, suspension assemblies 30 attached to the corresponding arms 32, and the magnetic heads 17 supported by the respective suspension assemblies 30. The actuator block 29 is rotatably supported by the bearing unit 28 around a support shaft (pivot) 31 stood on the bottom wall 12a.

In the present embodiment, the actuator block 29 and the five arms 32 are integrally formed of aluminum or the like to constitute a so-called E-block. Each of the arms 32 is formed into, for example, an elongated flat plate shape and extends from the actuator block 29 in a direction orthogonal to the support shaft 31. The five arms 32 are spaced in parallel with each other.

The actuator assembly 22 comprises a support frame 33 that extends from the actuator block 29 in a direction opposite to the arms 32. A voice coil 35 partially constituting the VCM 24 is supported by the support frame 33. As illustrated in FIG. 1, the voice coil 35 is positioned between a pair of yokes 37 provided in the base 12. Together with the yokes 37 and a magnet fixed to the either of the yokes 38, the voice coil 35 constitutes the VCM 24.

As illustrated in FIG. 2, the actuator assembly 22 comprises eight suspension assemblies 30 that support the magnetic heads 17, and these suspension assemblies 30 are attached to distal end portions 32a of the respective arms 32. The suspension assemblies 30 include up head suspension assemblies supporting magnetic heads 17 upward and down head suspension assemblies supporting magnetic heads 17 downward. The up head suspension assembly and the down head suspension assembly are identical in structure but are disposed mutually upside down.

In the present embodiment, in FIG. 2, a down head suspension assembly 30 is mounted to an uppermost arm. 32, and an up head suspension assembly 30 is mounted to a lowermost arm 32. Up head suspension assemblies 30 and down head suspension assemblies 30 are mounted to three intermediate arms 32.

Next, an example of a suspension assembly 30 will be described in detail.

FIG. 3 is a perspective view of the suspension assembly, FIG. 4 is an exploded perspective view of the suspension assembly, and FIG. 5 is a plan view of the suspension assembly.

As illustrated in FIGS. 3 and 4, each suspension assembly 30 includes a suspension 34 that extends from an arm 32, and a magnetic head 17 is attached to a distal end portion of the suspension 34. Note that the magnetic head 17 and the suspension assembly 30 supporting the magnetic head. 17 are collectively referred to as a head suspension assembly.

The suspension 34 functioning as a support plate includes a base plate 36 of rectangular shape that is made of a metal plate having a thickness of several hundred micrometers and a load beam. 38 of leaf spring shape that is made of a metal plate having a thickness of several ten micrometers. The load beam 38 has a distal end portion that constitutes a distal end portion of the support plate, and a proximal end portion of the load beam 38 and the base plate 36 constitute a proximal end portion of the support plate. The proximal end portion of the load beam 38 is arranged to overlay on a distal end portion of the base plate 36 and is fixed to the base plate 36 by being welded at a plurality of positions. The proximal end portion of the load beam 38 has a width which is substantially equal to the width of the base plate 36. A tab 40 of rod shape is protrudingly provided at the distal end of the load beam 38.

The base plate 36 has a proximal end portion that includes a circular opening 36a and an annular projection 36b located around the opening 36a. The base plate 36 is fastened to the distal end portion 32a of the arm 32 by fitting the projection 36b to a circular swage hole, not illustrated, that is formed in a swaged seat surface of the arm 32 and swaging the projection 36h. The proximal end of the base plate 36 may be fixed to the distal end portion 32a of the arm 32 by laser welding, spot welding, or adhesion.

The suspension assembly 30 comprises a flexure (wiring member) 42 of elongated strip shape, configured to transmit a recording/reading signal and a drive signal for a piezoelectric element, and a pair of piezoelectric elements (e.g., PZT elements) 50 mounted on the flexure 42. As illustrated in FIGS. 2 and 3, the flexure 12 includes a distal end side portion 12a that is arranged on the load beam 38 and the base plate 36, a proximal end side portion 42b that extends outward from a side edge of the base plate 36 and extends to the actuator block 29 along a side edge of the arm 32, and a connection end portion 42c that extends from an extending end of the proximal end side portion 42b. The connection end portion 42c includes a plurality of connection pads 43 arranged side by side. These connection pads 43 are electrically joined to connection terminals of a wiring board 51 installed in the actuator block 29.

As illustrated in FIGS. 3, 4, and 5, a distal end portion of the flexure 42 is provided on the distal end portion of the load beam 38 and constitutes a gimbal portion 44 that functions as a resilient support portion. The magnetic head 17 is placed and fixed on the gimbal portion 44 and supported by the load beam 38 via the gimbal portion 44. The pair of piezoelectric elements 50 as drive elements are mounted on the gimbal portion 44 and arranged on both sides of the magnetic head 17 in the width direction of the magnetic head 15.

The flexure 42 comprises a thin metal plate (metal plate) 46 of stainless steel or the like serving as the base, and a belt-shaped lamination member (a flexible printed wiring substrate: FPC) 48 which is adhered or fixed onto the thin metal plate 46, thereby forming a long and narrow laminated plate. The lamination member (FPC) 48 includes a base insulating layer (first insulating layer), most of which is fixed to the thin metal plate 46, a conductive layer (wiring pattern) formed on the base insulating layer and constituting the plurality of signal wiring lines, the drive wiring lines, and the plurality of connecting pads, and a cover insulating layer (second insulating layer) which is laminated on the base insulating layer so as to cover the conductive layer. As the conductive layer, for example, copper foil is used, and the plurality of wiring lines, the drive wiring lines, and the connecting pads 43 are formed by patterning the copper foil.

In the distal end-side portion. 42a of the flexure 42, the thin metal plate 46 is adhered onto the surfaces of the load beam 38 and the base plate 36 or spot-welded thereto at multiple welding points. By way of an example, the thin metal plate 46 has two welding points (a first welded portion) B1 at which the metal plate 46 is welded to the proximal end portion of the load beam 38 and one welding point (a second welded portion) B2 at which the thin metal plate 46 is welded to the distal end of the load beam 38. In other words, the thin metal plate 46 is welded to the load beam 38 at at least two points, namely, welding point B1, which is located on the leading edge side of the magnetic head 17, and welding point B2, which is located on the trailing edge side of the magnetic head 17.

In the gimbal portion 44, the thin metal plate 46 integrally has a substantially rectangular tongue portion (support portion) 44a which is located on the distal end side, a substantially rectangular proximal end portion (first end portion) 44b which is located on the proximal end portion side and spaced apart from the tongue portion 44a, a pair of elastically deformable outriggers (link portions) 44c that displaceably support the tongue portion 44a connecting the proximal end portion 44b to the tongue portion 44a, a connecting frame 44d that extends, around the distal end side of the tongue portion 44a, from one outrigger 44c to the other outrigger 44c, and a substantially rectangular fixing pad portion (second end portion) 44e that extends from the connecting frame 44d and faces the distal end of the tongue portion 44a. The fixing pad portion 44e is located between the connecting frame 44d and the tongue portion 44a.

The proximal end portion 41b is adhered onto the surface of the load beam 38 and is spot-welded to the load beam 38 at welding point B1. The fixing pad portion 44e is spot-welded to the distal end of the load beam 38 at welding point B2. The welding point B2 is located on a medial axis C1 of the suspension 34.

In the gimbal portion 44, the thin metal plate 46 integrally comprises a pair of limiters 45 for regulating excessive displacement of the tongue portion 44a. In the present embodiment, the limiters 45 are provided integrally with the fixing pad portion 44e and are located on both sides of the second welded portion B2. The limiters 45 are, for example, substantially L-shaped, extend from the fixing pad portion 44e in a direction substantially perpendicular to the surface of the metal plate 46, and have a distal end that is bent toward the tongue portion 44a. Thus, the extending end (bent portion) of the limiters 45 lies opposite and perpendicularly spaced apart from the surface of the tongue portion 44a (the surface on the opposite side from the load beam 38, and the surface where the magnetic head 17 is mounted). Because the pair of limiters 45 are provided on the fixing pad portion 44e which is welded to the load beam 38, the limiters 45 are arranged in predetermined fixed positions relative to the load beam 38.

FIG. 8A is a plan view illustrating the thin metal plate during manufacturing, which integrally includes limiters, and FIG. 8B is a plan view illustrating the thin metal plate in a state where the limiters are formed by bending portions of the thin metal plate.

As illustrated in FIG. 8A, during manufacturing, the thin metal plate 46 integrally includes a pair of L-shaped limiter forming portions 45a that extend on both sides from the fixing pad portion 44e. By bending the respective limiter forming portions 45a substantially at right angles in the positions indicated by the broken lines in FIG. 8A, a pair of limiters 45 that lie opposite to a contact portion. 44f of the tongue portion 44a are formed, as illustrated in FIG. 8B.

Note that the limiters 45 are not limited to being a pair, rather, there may be one thereof or three or more thereof. Furthermore, the limiters 45 may have a section that lies opposite and spaced apart from the tongue portion 44a and are not limited to being L-shaped and may have another optional shape.

As illustrated in FIGS. 3, 4, and 5, the tongue portion 44a is formed having a size and shape enabling the magnetic heads 17 to be mounted and is formed substantially rectangular, for example. The tongue portion 44a is disposed such that the medial axis in the width direction thereof coincides with the medial axis C1 of the suspension 34. The tongue portion 14a has a rear end located on the proximal end portion 44b side and a distal end located on the distal end side of the suspension 34. Both ends of the rear end in the width direction are connected to the respective outriggers 44c. In the present embodiment, the tongue portion 44a integrally has a substantially rectangular contact portion 44f that protrudes from the distal end toward the fixing pad portion 44e. The contact portion 44f lies opposite and spaced apart from the limiters 45. When the tongue portion 44a is greatly displaced in a direction away from the load beam. 38, the contact portion 44f contacts the pair of limiters 45 and stops displacement of the tongue portion 44a.

The substantially central section of the tongue portion 44a makes contact with a dimple (protrusion) 52 which is erected at the distal end of the load beam 38. Through elastic deformation of the pair of outriggers 44c and the connecting frame 14d, the tongue portion. 44a can be displaced in various directions with the dimple 52 serving as a fulcrum. Thus, the tongue portions 44a and the magnetic heads 17 mounted on the tongue portions 44a are capable of being displaced in a roll direction or a pitch direction so as to flexibly track surface variations of the magnetic disks 18, thereby maintaining a minute gap between the surface of the magnetic disks 18 and magnetic heads 17.

In the gimbal portion 44, the lamination member 48 of the flexure 42 is disposed on the metal plate 46 and extends along the medial axis C1 from the proximal end portion 44b, through the space, and onto the tongue portion 44a. That is, the lamination member 48 has a proximal end portion 48a which is adhered onto the proximal end portion 44b, a distal end 48b which is adhered onto the tongue portion 44a, and a pair of belt-shaped bridge portions 48c which extend in a bifurcated shape from the proximal end portion 48a to the distal end. 48b. The pair of bridge portions 48c are located on both sides of the medial axis C1. A portion of the bridge portions 48c is disposed overlapping the tongue portion 44a, excluding the central section of the tongue portion 44a, and is adhered onto the tongue portion 44a.

The magnetic heads 17 have a substantially rectangular slider and a recording element and a reading element which are provided on the slider. The magnetic heads 17 are mounted on the tongue portions 44a so as to overlap the bridge portions 48c and are fixed to the bridge portions 18c and the tongue portions 44a by means of an adhesive or the like. The magnetic heads 17 are arranged such that the medial axis in the longitudinal direction thereof coincides with the medial axis C1 of the suspension 34 and such that the substantially central section of the magnetic heads 17 are located on the dimple 52. The recording element and reading element of the magnetic heads 17 are electrically connected to a plurality of electrode pads 54 on the distal end. 48b by means of a conductive adhesive such as solder or silver paste. Thus, the magnetic heads 17 are connected to the signal wires of the lamination member 48 via the electrode pads 54.

As the pair of piezoelectric elements 50, rectangular plate-shaped thin-film piezoelectric elements (PZT elements), for example, are used. The piezoelectric elements 50 are not limited to the thin-film type (on the order of 10 μm thick), rather, bulk-type or bulk-lamination type (at least 50 μm thick) piezoelectric elements may be used. Furthermore, the piezoelectric elements 50 are not limited to being PZT elements, rather, other piezoelectric elements may be used. Moreover, the driver elements are not limited to being piezoelectric elements, rather, other driver elements which are capable of expanding and contracting upon application of a current may also be used.

The piezoelectric elements 50 are arranged such that the longitudinal direction (expansion/contraction direction) thereof is parallel to the medial axis C1 of the suspension 34. Two piezoelectric elements 50 are arranged on both sides of the magnetic head 17 in the width direction and are arranged side by side in parallel. The respective one end of the piezoelectric elements 50 in the longitudinal direct ion is mounted on the distal end 48b and is electrically connected to the electrode pads 54 of the distal end 48b. The respective other end of the piezoelectric elements 50 in the longitudinal direction is mounted in a midsection of the bridge portions 48c and is electrically connected to the electrode pads of the bridge portions 48c. Thus, the piezoelectric elements 50 are connected to the drive wires of the lamination member 48 via the electrode pads.

As illustrated in FIGS. 1 and 2, the substrate unit 21 integrally has a substantially rectangular base portion 58, a long and narrow belt-shaped relay portion 57 that extends from the base portion 58, and a wiring substrate 51 which is provided continuously at the distal end of the relay portion 57. The base portion 58, relay portion 57, and wiring substrate 51 are formed from a flexible printed wiring substrate (FPC). The base portion 58 is disposed on the bottom wall 12a of the base 12, and the wiring substrate 51 is attached to the installation surface of the actuator block 29.

Electronic components such as a conversion connector and a plurality of capacitors (not illustrated) are mounted on the base portion 58. The wiring substrate 51 is provided with a multiplicity of connecting pads (not illustrated). The respective connecting ends 42c of the flexure 42 of the foregoing plurality of suspension assemblies 30 are bonded using solder, for example, to the connecting pads of the wiring substrate 51. Furthermore, a head IC (head amplifier) 53 is mounted on the wiring substrate 51, and the head IC 53 is connected to the connecting pads and the base portion 58 via a plurality of wires (not illustrated). Thus, the eight magnetic heads 17 of the actuator assembly 22 are electrically connected to the base portion. 58 via the wiring of the flexure 42, the connecting end 42c, the wiring substrate 51, the head IC 53, and the relay portion 57.

Figure 6:
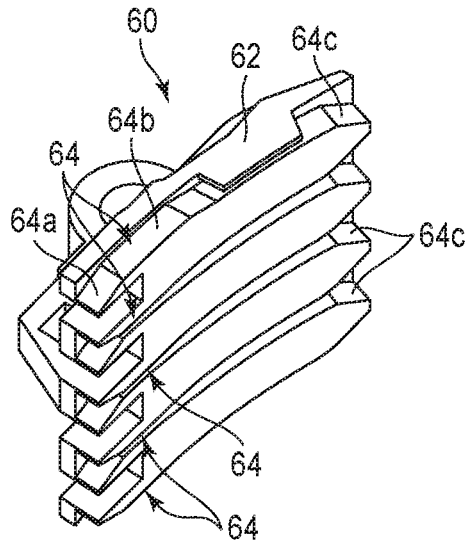
FIG. 6 is a perspective view illustrating a ramp of the HDD.

FIG. 6 is a perspective view illustrating a ramp of the ramp-load mechanism 25. As illustrated in FIGS. 1 and 6, the ramp-load mechanism. 25 has a ramp 60 that is installed on the base 12 and a tab 40 that is capable of engaging with the ramp 60. As mentioned hereinabove, the tab 40 is provided at the distal end of the load beam 38 of the suspension assembly 30.

The ramp 60 is fixed to the bottom wall 12a of the base 12 and is located close to the peripheral edge of the magnetic disk 18. The ramp 60 includes a ramp main body 62 that is formed in a block shape. Formed on one side portion of the ramp main body 62 are eight guide surfaces (guide portions) 64 that each support and guide the tabs 40 provided on the eight suspension assemblies 30. These guide surfaces 64 are arranged side by side at predetermined intervals along the axial direction of the magnetic disks 18 and so as to match the heights of the corresponding suspension assemblies 30. The respective guide surfaces 64 extend to positions close to the outer peripheral edge of the magnetic disks 18 substantially along the radial direction of the magnetic disks 18 and are arranged on the movement path of the tabs 40. The respective guide surfaces 64 have a first inclined surface 64a, inclined toward the magnetic disks 18, for loading and unloading the magnetic heads 17 onto/from the magnetic disks, a flat portion 64b that follows on from the first inclined surface 64a and extends parallel to the magnetic disk surface, and a second inclined surface 64c that extends obliquely from the other end of the flat portion 64b to the end of the guide surface.

A plurality of rectangular recesses are formed at the end of the ramp main body 62 on the magnetic disk 18 side. The recesses are located between two vertically adjacent guide surfaces 64. In a state where the ramp 60 is installed on the base 12, the outer peripheral edges of the four magnetic disks 18 are positioned with clearance within the respective corresponding recesses.

According to the HDD constituted as described above, during operation, the actuator assembly 22 is turned about the support shaft 31 by the VCM 24, and the plurality of magnetic heads 17 are moved to a desired seek position while lying opposite the surfaces of the respective magnetic disks 18. As illustrated in FIG. 1, when the HDD is not operating, the actuator assembly 22 is turned to the unload position, in which the magnetic head 17 is positioned on the outside of the outermost circumference of the magnetic disk 18, and the tabs 40 of the plurality of suspension assemblies 30 run aground on the respective corresponding guide surfaces 64 of the ramp 60. Accordingly, the magnetic heads 17 are retained, by the ramp 60, in the unload position spaced apart from the magnetic disks 18.

Figure 7A:
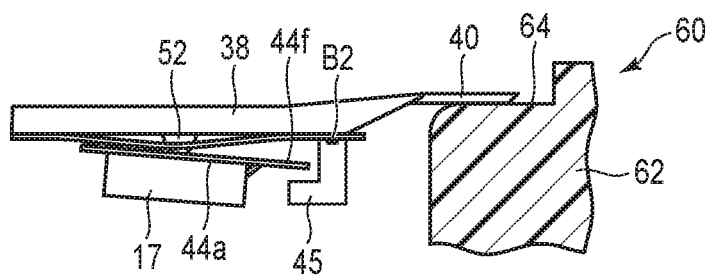
FIG. 7A is a side elevation schematically illustrating an engagement state between the distal end of the head suspension assembly and the ramp during normal operation.
Figure 7B:
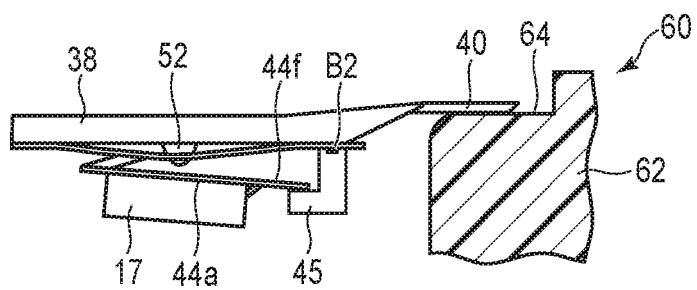
FIG. 7B is a side elevation schematically illustrating an engagement state between the distal end of the head suspension assembly and the ramp during impact.

FIGS. 7A and 7B are views schematically illustrating the positional relationship between the ramp 60 in the unload position and the suspension assemblies 30. As illustrated in FIG. 7A, during normal non-operation, the tabs 40 of the suspension assemblies 30 run aground on the guide surfaces 64 of the ramp 60 and are retained atop the guide surfaces 64. The magnetic heads 17 are retained, by the ramp 60, in the unload position spaced apart from the magnetic disks 18. The tongue portion 44a where the magnetic heads 17 are mounted makes contact with the dimple 52 and lies opposite and at a gap from each limiter 45.

In a state where the magnetic heads 17 are retained in the unload position, when the HDD is subjected to a large impact and the tongue portion 44a and the magnetic heads 17 are displaced in a direction away from the dimple 52, the distal end (the contact portion 44f) of the tongue portion. 44a makes contact with the pair of limiters 45 via the bent portion thereof, as illustrated in FIG. 7B, thereby regulating further displacement and deformation of the tongue portion 44a. That is, excessive displacement and deformation of the magnetic heads 17 and the tongue portion 44a are prevented by the limiters 45.

In the case of the HDD according to the first embodiment constituted as above, the gimbal portion 44 of the suspension assembly 30 includes the limiters 45, which are formed from a thin metal plate, and excessive displacement and deformation of the tongue portion 44a and the magnetic heads 17 are regulated by the limiters. Thus, even when the HDD is subjected to a large impact, damage to the tongue portion 44a due to excessive deformation thereof and collisions of magnetic heads with other magnetic heads can be prevented. Furthermore, the limiters 45 are formed by a portion of the thin metal plate constituting the gimbal portion 44, and therefore the limiters 45 can be easily provided in the gimbal portion 44 of the suspension assembly. In comparison with cases where the limiters are provided on another member such as the load beam, the manufacturing and assembly of the suspension assembly 30 are improved.

Based on the foregoing, according to the present embodiment, excessive displacement and deformation are prevented and a head suspension assembly and HDD that exhibit improved reliability are obtained.

Next, a suspension assembly according to a modification example will be described. Note that, in the various modification examples described hereinbelow, detailed descriptions are omitted or simplified by assigning the same reference signs to the same parts as those of the foregoing first embodiment. Configurations which are different from the first embodiment will now be described in detail.

First Modification Example

Figure 9B:
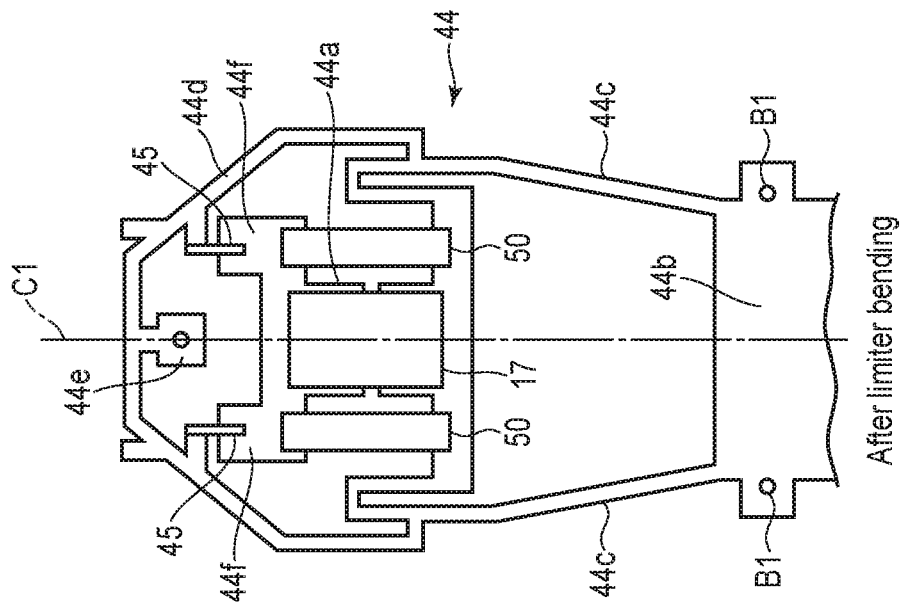
FIG. 9B is a plan view illustrating a state after bending of the limiters of the head suspension assembly according to the first modification example.
Figure 9A:
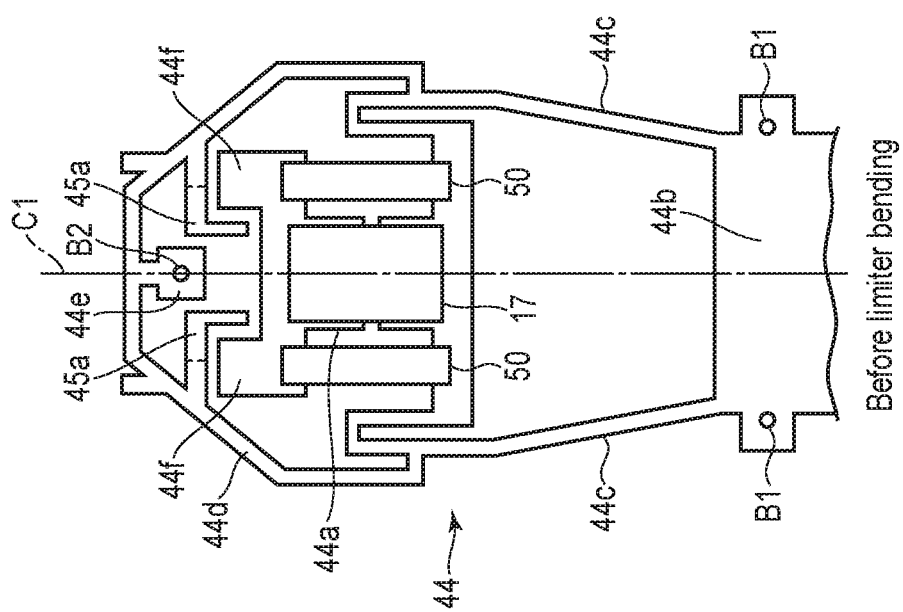
FIG. 9A is a plan view illustrating a state before bending of limiters of a head suspension assembly according to a first modification example.

FIG. 9A is a plan view illustrating a gimbal portion before bending of limiters of a head suspension assembly according to a first modification example, and FIG. 9B is a plan view illustrating the gimbal portion after bending of the limiters.

According to the first modification example, a pair of limiters 45 of a gimbal portion 44 are formed integrally with a connecting frame 44d. The pair of limiters 45 are formed by bending, at right angles, an L-shaped limiter forming portions 45a which extend toward the medial axis from the connecting frame 44d. Thus, the pair of limiters 45 are provided on both sides of the medial axis C1 at the trailing edge of a tongue portion 44a. Furthermore, the tongue portion 44a integrally has a pair of contact portions 44f that each lie opposite and at a gap from the limiters 45. When the tongue portion 44a is displaced in a direction away from the dimple, the pair of limiters 45 make contact with the pair of contact portions 44f and regulate further displacement of the tongue portion 44a.

Second Modification Example

FIG. 10A is a plan view illustrating a gimbal portion before bending of limiters of a head suspension assembly according to a second modification example, and FIG. 10B is a plan view illustrating the gimbal portion after bending of the limiters.

According to the second modification example, a pair of limiters 45 of a gimbal portion 44 are formed integrally with an outriggers 44c. The limiters 45 are formed by bending, at sight angles, an L-shaped limiter forming portions 45a which extend from the outriggers 44c toward the distal end side of a tongue portion 44a and parallel to the medial axis C1. Thus, the pair of limiters 45 are provided on both sides of the tongue portion 44a in the width direction. Furthermore, the tongue portion 44a integrally has a pair of contact portions 44f that each lie opposite and at a gap from the limiters 45. When the tongue portion 44a is displaced in a direction away from the dimple, the pair of limiters 45 make contact with the pair of contact portions 44f and regulate further displacement of the tongue portion 44a.

Third Modification Example

FIG. 11A is a plan view illustrating a gimbal portion before bending of limiters of a head suspension assembly according to a third modification example, and FIG. 11B is a plan view illustrating the gimbal portion after bending of the limiters.

According to the third modification example, a pair of limiters 45 of a gimbal portion 44 are formed integrally with an outriggers 44c. The limiters 45 are formed by bending, at right angles, an L-shaped limiter forming portions 45a which extend from the midsection of the outriggers 44c toward a medial axis C1. Thus, the pair of limiters 45 are provided on the proximal end portion side of a tongue portion 44a. The tongue portion 44a integrally has a pair of contact portions 44f that extend from the proximal end portion of the tongue portion 44a. The pair of contact portions 44f each lie opposite and at a gap from the limiters 45. When the tongue portion 44a is displaced in a direction away from the dimple, the pair of limiters 45 make contact with the pair of contact portions 44f and regulate further displacement of the tongue portion 44a.

Fourth Modification Example

FIG. 12A is a plan view illustrating a gimbal portion before bending of limiters of a head suspension assembly according to a fourth modification example, and FIG. 12B is a plan view illustrating the gimbal portion after bending of the limiters.

According to the fourth modification example, a gimbal portion 44 has a single limiter 45 which is formed integrally with a connecting frame 44d. The limiter 45 is integrally formed with an outriggers 44c. A fixing pad portion 44e extends from the connecting frame 44d in the opposite direction to that of a tongue portion 44a and is welded to the load beam at a welding point B2. The limiter 45 is formed by bending, at a right angle, a substantially T-shaped limiter forming portion 45a which is located on a medial axis C1 and extends from the connecting frame 44d toward the tongue portion 44a. The limiter 45 is provided between the connecting frame 44d and the tongue portion 44a on the medal axis C1. The limiter 45 has a pair of bent portions that each extend in a direction orthogonal to the medial axis C.

The tongue portion 44a integrally has a pair of contact portions 44f that extend from the distal end of the tongue portion 44a. The pair of contact portions 44f each lie opposite and at a gap from the bent, portions of the limiter 45. When the tongue portion 44a is displaced in a direction away from the dimple, the limiter 45 makes contact with the pair of contact portions 44f and regulates further displacement of the tongue portion 44a.

Fifth Modification Example

FIG. 13A is a plan view illustrating a gimbal portion before bending of limiters of a head suspension assembly according to a fifth modification example, and FIG. 13B is a plan view illustrating the gimbal portion after bending of the limiters.

According to the fifth modification example, a gimbal portion 44 integrally has two pairs of (four) limiters 45A and 45B. In this example, the gimbal portion 44 has a pair of limiters 45A that are formed integrally with a connecting frame 44d, and a pair of limiters 45B that are formed integrally with an outriggers 44c.

The pair of limiters 45A are formed by bending, at right angles, an L-shaped limiter forming portions 45a which extend toward a medial axis from the connecting frame 44d. Thus, the pair of limiters 45A are provided on both sides of the medial axis C1 on the distal end side of a tongue portion 44a. The pair of limiters 45B are formed by bending, at right angles, an L-shaped limiter forming portions 45b which extend from the midsection of the outriggers 44c toward the medial axis C1. Thus, the pair of limiters 45B are provided on the proximal end portion side of the tongue portion 44a.

The tongue portion 44a integrally has a pair of contact portions 44f that each extend from the distal end thereof and that lie opposite and at a gap from the limiters 45A, and another pair of contact portions 44f that each extend from the proximal end portion thereof and that lie opposite and a gap from the limiters 45B.

When the tongue portion 44a is displaced in a direction away from the dimple, the pair of limiters 45A and the pair of limiters 45B each make contact with the opposing contact portions 44f and regulate further displacement of the tongue portion 44a.

In the foregoing first to fifth modification examples, the rest of the configuration of a suspension assembly 30 is the same as the suspension assembly in the foregoing first embodiment. The same actions and effects as in the foregoing first embodiment can also be obtained in any of the first to fifth modification examples.

While certain embodiments or modifications have been described, these embodiments or modifications have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The magnetic disks are not limited to five, rather, there may be no more than four or at least six thereof, and the number of suspension assemblies and the number of magnetic heads may also be increased or reduced according to the number of magnetic disks installed. The shape and size, and so forth, of the connection terminals of the connecting ends of the suspension assemblies are not limited to those of the foregoing embodiments, and various changes can be made according to requirements. The type and function of the connection terminals are not limited to those of the foregoing embodiments, and various changes can be made according to the functions or the magnetic heads and suspension assemblies.

What is claimed is:

1. A suspension assembly, comprising:
a support plate including a distal end portion and a proximal end portion;
a wiring member comprising a gimbal portion and provided on the support plate; and
a magnetic head mounted on the gimbal portion, wherein
the gimbal portion comprises a first end portion located on a side of the proximal end portion with respect to the magnetic head and welded to the support plate, a second end portion located on a side of the distal end portion with respect to the magnetic head and welded to the support plate, a tongue portion on which the magnetic head is mounted, located between the first end portion and the second end portion, and supported so as to be displaceable relative to the support plate, the tongue portion including a first surface on which the magnetic head is mounted and a second surface opposite to the first surface and facing the support plate, and a limiter overlapping the tongue portion in a direction crossing the first surface and opposing the first surface of the tongue portion with a gap.

2. The suspension assembly of claim 1, wherein
the gimbal portion includes a plurality of limiters, each of the limiters being opposed to the first surface of the tongue portion with a gap.

3. The suspension assembly of claim 1, wherein
the gimbal portion comprises an elastically deformable outrigger connected to the first end portion and the tongue portion, and a connecting frame connected to the second end portion and the outrigger, and
the limiter is provided at the connecting frame and opposed to an end of the tongue portion on a side of the distal end portion with a gap.

4. The suspension assembly of claim 3, wherein
the wiring member comprises a metal plate disposed on the support plate, and a flexible wiring substrate fixed onto the metal plate, and
in the gimbal portion, the first end portion, the second end portion, the outrigger, the connecting frame, and the limiter are formed by the metal plate.

5. The suspension assembly of claim 1, wherein
the gimbal portion comprises an elastically deformable outrigger connected to the first end portion and the tongue portion, and a connecting frame connected to the second end portion and the outrigger, and
the limiter is provided at the second end portion and opposed to an end of the tongue portion on a side of the distal end portion with a gap.

6. The suspension assembly of claim 5, wherein
the wiring member comprises a metal plate disposed on the support plate, and a flexible wiring substrate fixed onto the metal plate, and
in the gimbal portion, the first end portion, the second end portion, the outrigger, the connecting frame, and the limiter are formed by the metal plate.

7. The suspension assembly of claim 1, wherein
the gimbal portion comprises an elastically deformable outrigger connected to the first end portion and the tongue portion, and a connecting frame connected to the second end portion and the outrigger, and
the limiter is provided at the outrigger and opposed to an end of the tongue portion on a side of the proximal end portion with a gap.

8. The suspension assembly of claim 7, wherein
the wiring member comprises a metal plate disposed on the support plate, and a flexible wiring substrate fixed onto the metal plate, and
in the gimbal portion, the first end portion, the second end portion, the outrigger, the connecting frame, and the limiter are formed by the metal plate.

9. A disk device, comprising:
a disk-shaped recording medium comprising a recording layer; and
a suspension assembly, comprising:
a support plate including a distal end portion and a proximal end portion;
a wiring member comprising a gimbal portion and provided on the support plate; and
a magnetic head mounted on the gimbal portion, wherein
the gimbal portion comprises a first end portion located on a side of the proximal end portion with respect to the magnetic head and welded to the support plate, a second end portion located on a side of the distal end portion with respect to the magnetic head and welded to the support plate, a tongue portion on which the magnetic head is mounted, located between the first end portion and the second end portion, and supported so as to be displaceable relative to the support plate, the tongue portion including a first surface on which the magnetic head is mounted and a second surface opposite to the first surface and facing the support plate, and
a limiter overlapping the tongue portion in a direction crossing the first surface and opposing the first surface of the tongue portion with a gap.

10. The disk device of claim 9, wherein
the gimbal portion includes a plurality of limiters, each of the limiters being opposed to the first surface of the tongue portion with a gap.

11. The disk device of claim 9, wherein
the gimbal portion comprises an elastically deformable outrigger connected to the first end portion and the tongue portion, and a connecting frame connected to the second end portion and the outrigger, and
the limiter is provided at the connecting frame and opposed to an end of the tongue portion on a side of the distal end portion with a gap.

12. The disk device of claim 11, wherein
the wiring member comprises a metal plate disposed on the support plate, and a flexible wiring substrate fixed onto the metal plate, and
in the gimbal portion, the first end portion, the second end portion, the outrigger, the connecting frame, and the limiter are formed by the metal plate.

13. The disk device of claim 9, wherein
the gimbal portion comprises an elastically deformable outrigger connected to the first end portion and the tongue portion, and a connecting frame connected to the second end portion and the outrigger, and
the limiter is provided at the second end portion and opposed to an end of the tongue portion on a side of the distal end portion with a gap.

14. The disk device of claim 13, wherein
the wiring member comprises a metal plate disposed on the support plate, and a flexible wiring substrate fixed onto the metal plate, and
in the gimbal portion, the first end portion, the second end portion, the outrigger, the connecting frame, and the limiter are formed by the metal plate.

15. The disk device of claim 9, wherein
the gimbal portion comprises an elastically deformable outrigger connected to the first end portion and the tongue portion, and a connecting frame connected to the second end portion and the outrigger, and
the limiter is provided at the outrigger and opposed to an end of the tongue portion on a side of the proximal end portion with a gap.

16. The disk device of claim 15, wherein the wiring member comprises a metal plate disposed on the support plate, and a flexible wiring substrate fixed onto the metal plate, and
in the gimbal portion, the first end portion, the second end portion, the outrigger, the connecting frame, and the limiter are formed by the metal plate.

\* \* \* \* \*